Sept. 21, 1954  J. A. CLEIFF  2,689,485

DRIVING MECHANISM OF AND FOR POWER-DRIVEN DOMESTIC WRINGERS

Filed Nov. 15, 1951

Inventor
Joseph A. Cleiff
By William Straus
Attorney

Patented Sept. 21, 1954

2,689,485

UNITED STATES PATENT OFFICE 2,689,485

DRIVING MECHANISM OF AND FOR POWER-DRIVEN DOMESTIC WRINGERS

Joseph Alexander Cleiff, Birmingham, England, assignor to Aluminium Bronze Company Limited, Walsall, England Application November 15, 1951, Serial No. 256,434

Claims priority, application Great Britain April 5, 1951

6 Claims. (Cl. 74—355)

This invention relates to driving mechanism of and for power-driven domestic wringers of the kind in which a driving toothed wheel is engaged selectively by either of two driven toothed wheels in such a manner that when one of the driven wheels is in mesh it is driven in one direction of rotation while when the other wheel is in mesh, the latter is driven in the opposite direction of rotation, such system of gearing being generally described as forward and reverse.

The object of the invention is the provision of gearing of the kind referred to in which engagement or disengagement of the gear wheels is easy, convenient and effected by only a small angular motion of the actuating means; which is not likely to slip out of mesh; which is reliable; and which has a comparatively long life.

Reference may be had to the accompanying drawings in which

Figure 1:
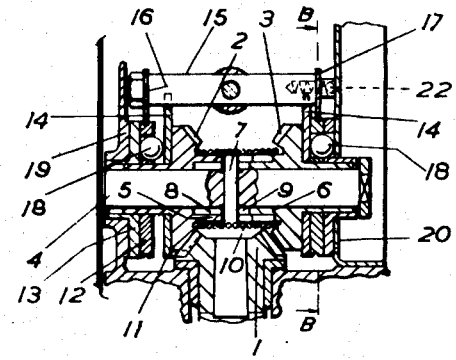
Figure 1 is a sectional side elevation on line C—C of Figure 3 of driving mechanism according to the invention showing one driving wheel in mesh and one driven wheel out of mesh.

In an embodiment of the invention applied to a driving mechanism comprising a driving bevel wheel 1 rotatable about an upright axis, and a pair of driven bevel wheels 2, 3 rotatable about a horizontal axis and also movable along said axis for selective enmeshment with or disengagement from the driving wheel to provide for forward and reverse drive, the two driven wheels are slidably but non-rotatably mounted on a central shaft 4 which transmits the driving torque to one of the roller shafts, conveniently the lower one. Preferably the hubs 5, 6 of the two wheels telescope the one within the other and are connected with the central shaft by a transverse pin 7 which cooperates with slots 8, 9 in the hubs to allow the sliding movement.

Intermediate to the two driven wheels is placed a spring 10 of the coiled compression type with its end coils abutting against the respective inner faces of the two wheels to press them into the demeshed position or positions under the control of the meshing devices which are arranged to operate on the outer faces of the two wheels.

Each meshing device includes three coaxial contiguous discs 11, 12, 13 which will be referred to as inner, outer, and intermediate with the faces of the intermediate one 12 in contact with the adjacent faces of the inner 11 and outer 13 discs in the unmeshed position of the wheel. The outer disc 13 is static, the intermediate disc 12 is mounted for a restricted amount of angular movement about the axis of the shaft, and the inner thrust disc 11 next to the wheel can move axially but is inhibited from turning more than said restricted amount by a radial arm 14 slidable at its outer end on a pin or bar 15 which connects the actuating lever arms 16, 17 fast with the two intermediate discs 12.

Figure 4:
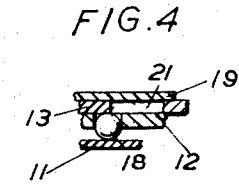
Figure 4 is a fragmentary view showing the action of the balls included in Figures 1 and 2.

At equal angular distances in the outer and intermediate discs are formed holes wherein are housed a like number, say three or four, of balls 18 (though plungers with ball ends may be used as an alternative) arranged with one half or preferably slightly less of each ball contained in the outer disc and the other half or remainder in the intermediate disc when in the unmeshed position, the diameter of a ball being equal to the joint thickness of the two discs. The holes in the outer discs are closed at the one side by adjacent members 19, 20 of the wringer frame. When the intermediate discs are moved angularly about their common axis carrying the balls with them in a like motion, those in the left hand disc in the case illustrated climb the walls of the holes in said disc on to the inner face thereof as depicted in Figure 4 and in so doing have imparted to them an axial movement equal to the depth of their holes or cavities i. e. the thickness of the static disc, in the present instance. In moving axially, the balls protrude from the intermediate disc and move axially the thrust disc 11 and through it the adjacent gear wheel 2 which is thus meshed with the driving wheel against the reactive pressure of the spring 10. By an angular reverse movement of the intermediate disc, the several movable parts return to their starting position, and the wheel is demeshed by the spring.

Figure 2:
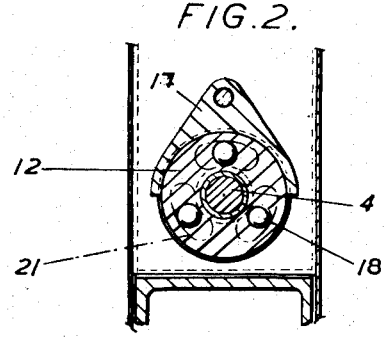
Figure 2 is a sectional elevation on line B—B of Figure 1 in neutral position.
Figure 3:
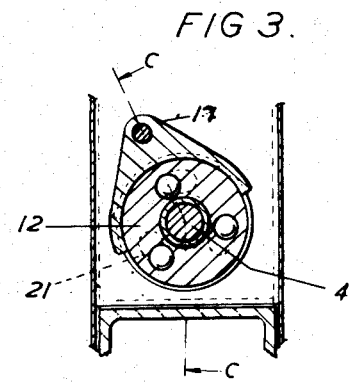
Figure 3 is a similar view to Figure 2 but with the mechanism in an in-gear position.

As before mentioned, a wheel moving device is placed at the back of each of the two driven wheels, and to provide for the three positions of forward, neutral, and reverse, the holes 21 in the static disc are elongated to an arcuate shape. The slots in one static disc are opposite in an angular direction relatively to those in the other static disc (one set being shown in dotted lines and the other set in dot and dash lines Figure 2) in order that an anticlockwise movement jointly of the intermediate discs from neutral position finally results in one of the driving wheels being enmeshed, while a similar but clockwise movement of the discs enmeshes the other driving wheel, the return movement of the first disc having already allowed the first wheel to disengage by spring pressure.

A spring controlled detent may be incorporated at any suitable position e. g. 22 shown in Figure 1 to hold the mechanism in any one of the three positions before indicated.

In the transmission shaft between the driven wheels and the roller is incorporated a lost motion coupling (not illustrated) by which a movement of such wheels is at all times effected without loading from roller drive reaction.

Having thus described my invention, what I claim is:

1. Driving mechanism for a power-driven wringer including a driving wheel and a driven wheel engageable therewith for turning a roller and movable axially towards or away from the driving wheel, and a device for effecting said axial movement comprising two contiguous discs which are co-axial to the driven wheel and of which one is static whereas the other is disposed between the static disc and the driven wheel and is movable axially and also is displaceable angularly about the axis of the said driven wheel, means for imparting angular movement to the said movable disc, and a series of angularly spaced and axially displaceable elements housed partly in cavities formed in the static disc and partly in cavities formed in the movable disc and movable axially from the cavities in the static disc upon angular displacement of the movable disc by the said means to impart an axial displacement to the movable disc and the driven wheel against the action of a spring acting on the said wheel.

2. Driving mechanism for a power-driven wringer including a driving wheel and a driven wheel engageable therewith for turning a roller and movable axially towards or away from the driving wheel, and a device for effecting said axial movement comprising three coaxial contiguous discs which include an inner axially slidable disc adjacent to the back of the driven wheel to transmit axial movement thereto, an intermediate disc angularly movable about the axis of the driven wheel, and a static outer disc; means for rotating said intermediate disc relative to said static disc; a series of angularly spaced slidable elements housed partly in cavities formed in the intermediate disc and partly in cavities formed in the static disc and movable axially from the cavities in said static disc upon angular movement of the intermediate disc by said means to produce an axial displacement of the slidable inner disc and the driven wheel; and a spring arranged to effect a return movement to starting position of the driven wheel and the slidable elements on a reverse movement of the intermediate disc.

3. Mechanism according to claim 1 including a pair of driven wheels one for forward and one for reverse adapted to be selectively connected to the driving wheel by two wheel moving devices, in which the cavities in the relatively movable members are lengthened arcuately in opposite angular directions so that when axial movement is communicated to one driven wheel, the other driven wheel is not moved axially.

4. Mechanism according to claim 2 including an intermediate disc and an outer disc provided with cavities which extend therethrough, and a member which abuts the face of the outer disc away from the driven wheel to close the cavities in said face.

5. Mechanism according to claim 1 including a pair of driven wheels, a roller driving shaft, and means connecting said wheels with said shaft comprising a radial pin in the shaft, an inwardly extending boss on each driven wheel, and axial slots in said bosses engaged slidably and non-rotatably by said pin.

6. Mechanism according to claim 2 including a pair of driven wheels, one for forward and one for reverse, adapted to be selectively connected to the driving wheel by two wheel moving devices, in which the cavities in the relatively static discs are lengthened arcuately in opposite angular directions so that when axial movement is communicated to one driven wheel, the other driven wheel is not moved axially.

References Cited in the file of this patent

UNITED STATES PATENTS

| Number | Name | Date |
| --- | --- | --- |
| 1,227,388 | Churchill | May 22, 1917 |
| 1,237,158 | Bottger | Aug. 14, 1917 |
| 2,485,741 | King | Oct. 25, 1949 |